(12) United States Patent
Huang

(10) Patent No.: US 10,935,379 B2
(45) Date of Patent: Mar. 2, 2021

(54) METHOD AND APPARATUS FOR QUANTUM MEASUREMENT VIA MODE MATCHED PHOTON CONVERSION

(71) Applicant: The Trustees of the Stevens Institute of Technology, Hoboken, NJ (US)

(72) Inventor: Yuping Huang, Norwood, NJ (US)

(73) Assignee: The Trustees of the Stevens Institute of Technology, Hoboken, NJ (US)

(*) Notice: Subject to any disclaimer, the term of this patent is extended or adjusted under 35 U.S.C. 154(b) by 495 days.

(21) Appl. No.: 15/824,832

(22) Filed: Nov. 28, 2017

(65) Prior Publication Data
US 2018/0149476 A1 May 31, 2018

Related U.S. Application Data

(60) Provisional application No. 62/427,604, filed on Nov. 29, 2016.

(51) Int. Cl.
*G01C 3/08* (2006.01)
*G01S 17/06* (2006.01)
(Continued)

(52) U.S. Cl.
CPC ............... *G01C 3/08* (2013.01); *G01S 17/06* (2013.01); *G01S 17/10* (2013.01); *H04B 10/70* (2013.01);
(Continued)

(58) Field of Classification Search
None
See application file for complete search history.

(56) References Cited

U.S. PATENT DOCUMENTS

2002/0135749 A1* 9/2002 Maimon ................. G01S 17/08
356/4.07
2002/0140941 A1* 10/2002 Pedigo ................... B82Y 10/00
356/450
(Continued)

FOREIGN PATENT DOCUMENTS

WO WO2012050644 A1 4/2012

OTHER PUBLICATIONS

Yu-Ping Huang, Joseph B. Altepeter, and Prem Kumar "Heralding single photons without spectral factorability" Physical Review A 82, 043826 (2010) (Year: 2010).*
(Continued)

*Primary Examiner* — Isam A Alsomiri
*Assistant Examiner* — Amir J Askarian
(74) *Attorney, Agent, or Firm* — Lewis Roca Rothgerber Christie LLP

(57) ABSTRACT

The present disclosure relates to a generally-applicable measurement technique based on coherent quantum enhancement effects and provides embodiments with non-linear optics. The technique utilizes parametric nonlinear processes where the information-carrying electromagnetic quanta in a number of electromagnetic modes are converted phase coherently to signature quanta in a single mode or a few modes. The phase coherence means that while the quanta before conversion may have unequal or uncertain phase values across the modes, the signature quanta converted from those different modes have the (near) uniform phase. This can lead to significant increase in the signal to noise ratio in detecting weak signal buried in strong background noise. Applications can be found in remote sensing, ranging, biological imaging, field imaging, target detection and identification, covert communications, and other fields (Continued)

that can benefit from improved signal to noise ratios by using the phase coherent effect.

16 Claims, 3 Drawing Sheets

(51) Int. Cl.
    *H04B 10/70*     (2013.01)
    *G01S 17/10*     (2020.01)
    *B82Y 20/00*     (2011.01)
    *B82Y 15/00*     (2011.01)
    *G01S 17/42*     (2006.01)

(52) U.S. Cl.
    CPC ............... *B82Y 15/00* (2013.01); *B82Y 20/00* (2013.01); *G01S 17/42* (2013.01)

(56) References Cited

U.S. PATENT DOCUMENTS

| | | | | |
|---|---|---|---|---|
| 2006/0245680 | A1* | 11/2006 | Rasmussen | H04B 10/2569 385/11 |
| 2008/0089698 | A1 | 4/2008 | Jiang et al. | |
| 2008/0138087 | A1* | 6/2008 | Snyder | H04B 10/70 398/182 |
| 2009/0257464 | A1* | 10/2009 | Dantus | G01J 11/00 372/25 |
| 2010/0177297 | A1 | 7/2010 | Guha et al. | |
| 2012/0076503 | A1* | 3/2012 | Habif | G01S 17/08 398/140 |
| 2015/0261058 | A1* | 9/2015 | Silverstone | H04B 10/70 385/3 |
| 2016/0047643 | A1* | 2/2016 | Yuan | H01S 5/4006 398/25 |
| 2016/0370462 | A1* | 12/2016 | Yang | G01S 7/4815 |
| 2018/0081255 | A1* | 3/2018 | Reimer | G06N 10/00 |
| 2019/0121292 | A1* | 4/2019 | Kim | G03H 1/0866 |

OTHER PUBLICATIONS

Lloyd, "Enhanced Sensitivity of Photodetection via Quantum Illumination", Science, vol. 321, 1463-1465 (Sep. 12, 2008).

Huang, et al., "Heralding single photons without spectral factorability", Phys. Rev. A 82, 043826 (2010).

Shahverdi, et al., "Quantum Parametric Mode Sorting: Beating the Time-Frequency Filtering", Scientific Reports 7:6495 (Jul. 26, 2017).

Huang, et al., "Mode-resolved photon counting via cascaded quantum frequency conversion", Optics Letters, vol. 38, No. 4, 468-470 (Feb. 8, 2013).

* cited by examiner

METHOD AND APPARATUS FOR QUANTUM MEASUREMENT VIA MODE MATCHED PHOTON CONVERSION

CROSS-REFERENCE TO RELATED APPLICATION

This application relates to U.S. Provisional Patent Application No. 62/427,604 filed Nov. 29, 2016, the entire disclosure of which is incorporated herein by reference.

FIELD OF THE INVENTION

The present disclosure relates to method and apparatus adapted for quantum metrology, remote sensing, imaging and covert communications.

BACKGROUND OF THE INVENTION

Measurement devices based on the detection of reflected lightwave, microwave, or radio signals can take dynamic, 3D images of remote targets, giving rise to a wealth of robust applications, such as remote sensing, ranging, biological scanning, field imaging, stand-off target identification, and vehicle speed determination. In a typical configuration using radio-wave signals—widely known as radio detection and ranging, or radar—a radio wave beam is created and emitted along a direction of interest. By measuring the reflected radio wave, the presence of an object over distance can be inferred, maybe along with information on the object's shape, speed, and so on.

Light detection and ranging, or lidar, operates on a similar principle but uses light waves in place of radio waves. As light waves have much shorter wavelengths than radio waves, lidar can generally offer significantly better coordinate precision and imaging resolution.

Radar and lidar are two exemplary, but not the only measurement techniques based on the detection of reflected signals. In such techniques, however, a major limitation on performance arises from the presence of background noises. When background noises share the same spectral band and arrival time with the reflected signals, it is difficult, if not impossible, to distinguish them from the information-carrying signals, resulting in false alarms, incorrect object identification, distorted images, and so on.

For many measurement devices, the performance is ultimately limited by the signal to noise ratio (SNR) as detected. In addition, when classical beams (e.g., a laser beam, a radio wave) are used, an adverse party can measure the emitted signal and generate a mimicking signal and send it back to cheat the detection device. This method of attack is sometimes referred to as "spoofing." While techniques like pulse shaping and modulating can make the spoofing difficult to implement in practice, they do not exclude or detect the presence of spoofing.

To improve the SNR, "quantum illumination" (QI) has been proposed, in which a pair of entangled photons are prepared in M (M is much greater than 1) electromagnetic modes. One photon in the pair is sent out for detection, and upon reflection, the returning photon is jointly detected with the other photon kept in place. By a pure mathematical argument, it was shown that the SNR can be increased by a factor of M. This idea was followed with expanded analyses proposing a specific realization using Gaussian states.

In various techniques based on QI or its derivatives, entangled quantum states in photons are used. However, quantum entanglement in photons is susceptible to loss, scattering, and/or environmental disturbances. Thus, while a significant advantage in SNR can be established per returning photon over the classical systems (e.g., those of lidar and radar) using the same total amount of photons for detection, the performance of those quantum systems in practice is often worse than the classical systems, as the latter can instead deploy bright beams of much more photons for detection. To understand this, consider using a single pair of photons in M modes (assuming M~1000 under typical settings) in a typical QI application. Per reflected and detected photon (which occurs at a very low probability in typical environment settings due to scattering loss, absorption, and so on), the quantum-entanglement based techniques can in theory achieve about M-times better SNR than a classical system. However, the classical system can use many photons, say N photons, simultaneously per detection trial, instead of just a single photon in the QI application, so that the probability of successfully obtaining a returned signal (i.e., a reflected photon) is N times stronger. For a typical bright optical pulse in the visible spectral band with 1 watt peak power and 1 ns pulse duration, there are N~10 billion photons contained in the pulse, which is much larger than M. For the same background noise level, the detected SNR can therefore be higher for the classical systems than the quantum entanglement-based systems, such as QI and its derivatives, because much more photons can be sent out for detection per detection trial for the classical systems. This deficiency restricts the utilities of quantum-entanglement based measurement systems.

SUMMARY OF THE INVENTION

In view of the foregoing background, a measurement technique based on coherent quantum-mechanical enhancement effects is disclosed. The technique utilizes parametric nonlinear processes where information-carrying electromagnetic quanta (e.g., optical photons, microwave photons, radio photons) in a large number of electromagnetic modes are converted phase coherently to signature quanta in a single mode or a few modes. The phase coherence means that while the quanta before conversion may have unequal or uncertain phase values across the modes (such as the quanta in different modes have nonzero, stochastic relative phases between each other), the signature quanta converted from those different modes to the same mode have a (near) uniform phase, i.e., the relative phase values for most quanta are close to zero, well within 180 degree. This phase coherence can lead to significant increase in the signal to noise ratio in detecting weak signals buried in strong background noises.

In one embodiment, a beam of signal quanta in M modes (M being greater than one), each paired with a quantum in a separate idler beam, is created in a nonlinear device to use as a probe for measurement. The average number of quanta in each signal or idler mode can be less, equal, or greater than one. The relative phases between signal quanta in different modes are random. The relative phases between idler quanta in different modes are random, too. However, each signal quantum is created with an idler quantum to form a pair, where the sum or difference between the phases of the paired signal and idler quanta is uniform across different modes. The signal beam is sent to interact with a remote target of interest while the idler beam is retained in place. The reflected signal quanta, which are randomly distributed in different modes, are combined and temporally aligned with the idler beam. Here the temporal alignment means that the mode of each signal quantum overlaps with the mode of its paired idler quantum, similarly to how the two overlap when they are created in pairs in the first place. The combined beams are then passed through a nonlinear device, during which the signal quanta are converted by the idler beam to create signature quanta in a single mode through a parametric nonlinear process. When the generation and conversion of the signal are carried out in during nonlinear processes of identical or similar nonlinear properties, the conversion is phase coherent. The resulting conversion efficiency is higher for the reflected signal than the accompanying background noises, even when the noises share the same modes with the reflected signal, including with the same arrival time, over the same spectral band, in the same polarization, and with the same orbital angular momenta. The created signature quanta are subject to mode-selective detection to ensure that only those in the desired mode(s) are registered in the measurement. Based on the measurement results, the information of the detected object (s), such as the distance from the detection device, the surface optical properties, and the speed, can be inferred.

The disclosed techniques can substantially improve the per-photon SNR similarly to how the QI and its derivative techniques can outperform their classical counterparts. However, unlike those based on QI or use of few-photon entangled states, the disclosed techniques can use instead bright twin beams, each containing many photons per measurement trial, such as those consisting of nanosecond pulses with one-watt peak power and 100 kHz pulse repetition rate. The twin beams do not need to be entangled, which contrasts strongly with those techniques and systems relying on having quantum entanglement in the photons. Thus, the disclosed techniques can lead to system performance substantially improved from that of the classical systems (e.g., radar and lidar) because of the higher SNR per reflected and detected signal photon, and substantially improved from those quantum-entanglement based systems because much more photons can be used per pulse. In one embodiment, the number of photons per pulse can vary arbitrarily from about 10 to over about 1 trillion, depending on the needs of specific applications.

The disclosed embodiments have many potential applications, including, but not limited to, the following: radar and lidar under low-visibility conditions where signal loss is strong; detection of remote objects with low reflectivity of radar/lidar signals, including stealthy aircrafts, semi-transparent objects, and other targets with reduced-reflection coatings; radar and lidar over extended distances; covert communications; imaging of a remote object in presence of strong atmospheric noises and disturbances; target surface profiling over extended distances; deep tissue imaging, where 3D images of deep tissue can be reconstructed through timing the reflected signals, even in the presence of strong loss and scattering; and self-driving automobiles, where accurate 3D images of the surrounding environment must be obtained reliably despite unpredictable background disturbances, including foreign light illumination on the detector whose strength is much higher than the reflected signal.

BRIEF DESCRIPTION OF THE DRAWINGS

For a more complete understanding of the present invention, reference is made to the following detailed description of embodiments considered in conjunction with the accompanying drawings, in which.

DETAILED DESCRIPTION OF EXEMPLARY EMBODIMENTS

Figure 1:
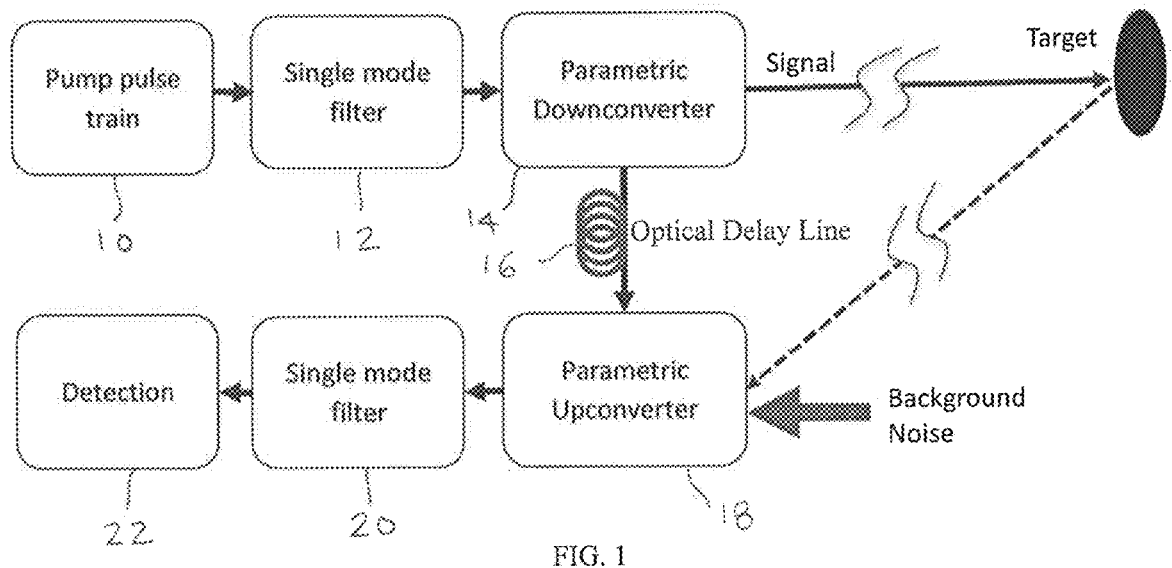
FIG. 1 is a schematic diagram of a quantum measurement process performed in accordance with an embodiment of the present invention, the process using a nonlinear optic setup.

The following disclosure is presented to provide an illustration of the general principles of the present invention and is not meant to limit, in any way, the inventive concepts discussed herein. Moreover, the particular features described in this section can be used in combination with the other described features in each of the multitude of possible permutations and combinations contained herein.

All terms defined herein should be afforded their broadest possible interpretation, including any implied meanings as dictated by a reading of the specification as well as any words that a person having skill in the art and/or a dictionary, treatise, or similar authority would assign thereto.

Further, it should be noted that, as recited herein, the singular forms 'a,' "an," and "the" include the plural referents unless otherwise stated. Additionally, the terms "comprises" and "comprising" when used herein specify that certain features are present in that embodiment; however, these terms should not be interpreted to preclude the presence or additional of additional steps, operations, features, components, and/or groups thereof.

In one embodiment of the present invention, a nonlinear device is pumped by optical pulses in a single electromagnetic mode to create twin beams, signal and idler, through a nonlinear parametric process, each containing a large number of photons spreading over many electromagnetic modes. The average photon number per mode can be larger than, equal to, or smaller than one. Because of the phase matching condition required for the twin-beam generation, each photon in the signal beam is paired with a photon in the idler beam. Here the phase matching condition refers to the conservation of energy and momentum during the nonlinear parametric process for the twin-beam generation. In the Hilbert space whose state bases correspond to the normal modes of the nonlinear parametric process (which are also referred to Schmidt modes obtained from the Schmidt decomposition of the output twin-beam quantum states), the photons are in paired time-frequency, polarization, and/or spatial degrees of freedom. In this realization, the twin-beam generation can start from a spontaneous emission process, such as spontaneous parametric downconversion, followed by parametric amplification of the twin beams. Alternatively, the twin-beam generation can start with a seedling signal or idler beam as the input to the nonlinear parametric device. The seedling beam needs to contain photons in many modes. In some embodiments, the seedling beam can be created through amplified spontaneous emission in a separate device. The above are just two examples to create the desired twin beams. There are alternate ways. For example, the signal beam and idler beam can be produced and manipulated separately such that each pair mode are phase coherent with other pair modes, similarly to the phase coherence resulting from their creation through the nonlinear parametric process driving by a single-mode pump.

The signal beam is then used as a probe and sent out for detection. Meanwhile, the idler beam is stored in a delay line or a buffer/memory device. The storage time is chosen to match the round-trip time for the signal to go out and return after reflection by the target. When the target's location is unknown, the storage time is scanned to look for the returning signals. The basic requirement for the storage is that the no significant amount of noises, such as phase noises, the background photons, and the uncontrolled distortion of the mode profiles, are added to the output idler beam.

Depending on the need, the idler beam can be amplified, such as using an optical parametric amplifier, a semiconductor optical amplifier, a Raman amplifier, an Erbium-Doped Fiber Amplifier, and a Praseodymium-Doped Fiber Amplifier. In one embodiment, the amplification does not introduce any significant amount of noises, such as phase noises, the background photons, and the uncontrolled distortion of the mode profiles, to the amplified idler beam.

The returning (reflected) signal and idler beams are relatively delayed to overlap in time (e.g., by temporal alignment) as they are co-produced in the first place. The temporally aligned beams are combined in a nonlinear parametric device, whose settings is such that paired photons (in different modes) from each beam are combined to phase coherently create new, signature photons in the same mode (e.g., with a shifted carrier frequency). The nonlinear device can be the same device for creating the twin beams, or a separate device but yielding similar phase matching properties.

In some embodiments, the returning signal beam could experience significant mode distortion, such as that caused by group velocity dispersion, heat scintillation, and multi-scattering in atmosphere. In such embodiments, the signal beam can first be guided through a linear optical system, such as a piece of dispersion-compensation fiber, to compensate for the mode distortion, before they are combined with the idler beam.

The created signature photons are then passed through an electromagnetic filter or a filter set, which selects only those photons in the electromagnetic modes identical or very similar to that of the pump creating the twin beams. Only those photons surviving the filtering will then be detected by, for example, photodiodes, photomultiplier tube, or single-photon detectors.

The detection results are then recorded and analyzed. By analyzing the round-trip time of the reflected signal, the distance of the detected object can be inferred. By scanning the launching and receiving angle of the signal beam, the transverse coordinate of the detected object(s) can be inferred and the surface profile of the object(s) can be reconstructed. By analyzing the strength of the returning signal, information about the surface/material properties of the detected object may also be obtained.

The above technique is generally applicable to the systems of optics, microwaves, radio waves, or a hybrid mixture of them. For example, the signal and idler can both be in the optical spectra, or both in the radio spectra, or one in the optical and the other in radio spectral regions.

When the signal and idler beams span over many electromagnetic modes, a significant advantage in the measurement SNR can be established over classical methods, e.g., those without using the signal-idler twin beams. In one embodiment, in which the photons in paired signal and idler beams are equally distributed in M modes, the SNR may be improved by a factor of about M. On a per-photon basis, this improvement factor is similar to the QI technique and its variants, which are based on the use of single pairs of entangled photons. The distinct advantage of the disclosed technique comes from the fact that each mode of the twin beams can contain many photons while still maintaining the improvement on a per-photon basis. Thus, compared with those based on entangled photons, a much brighter probe beam, i.e., a beam with a large amount of photons per pulse, can be used so that more signal photons can be reflected and detected, thus giving rise to substantially enhanced performance.

The procedural steps discussed above relate to an implementation of the technique in accordance with embodiments of the present invention. There are other forms of implementations. In various exemplary embodiments, implementations may be based on the following principle: when electromagnetic quanta in different electromagnetic modes are converted to create new quanta in the same mode, the generation of the new quanta will be enhanced if the conversion is a phase coherent process. Here, the phase coherence refers to the new quanta converted from different modes having the same phase, i.e., the relative phase being zero or nearly zero. By contrast, if the conversion from different modes is phase incoherent, the generation of new quanta would be less efficient.

By way of example, when the idler beam is temporally aligned and combined with the returning signal beam in the nonlinear device of identical or similar nonlinear properties with the device creating these twin beams, the signal photons in different modes can be converted to signature photons in a single mode or a few modes that resemble those of the pump that creates the signal and idler beams in the first place. In other words, the modes of the signature photons will be identical or similar to the pump modes in terms of carrier frequency, temporal profile, spectral profile, and so on. This conversion process is phase coherent across the many modes the signal photons can be in, as it is the time-reversal of the parametric twin-beam generation process through which the signal photons are initially created along with the idler photons. Hence, the conversion efficiency is high. By contrast, applying the same conversion process to the background photons, the conversion efficiency will be much lower due to the absence of phase coherence, even when the background photons share the same spectral band and arrival time with the true signal photons. Thus, the improvement in SNR in the disclosed technique relies on (i) generating a pair of signal and idler beams in well paired electromagnetic modes; (ii) phase coherent conversion of the reflected signal photons in multiple modes to signature photons in a single mode or a few modes by utilizing the idler beam; and (iii) discriminative detection of the signature photons in the single mode or a few modes.

There are multiple approaches to satisfying conditions (i) and (ii). One embodiment involves utilizing a parametric nonlinear device where bright twin beams are created by a train of pumping pulses, each pulse corresponding to a single electromagnetic mode. The twin beams are created by spontaneous photon-pair emission followed by parametric amplification. Another embodiment involves utilizing a parametric nonlinear device, a train of pumping pulses in a single mode, and a seedling signal or idler beam with photons in many electromagnetic modes. Passing through the nonlinear device, the seedling is amplified and a conjugate beam is created. In these embodiments, the nonlinear device has broadband phase matching whose bandwidth is many times larger than the spectral width of the driving pump pulses. Exemplary devices having this capability include lithium-niobate waveguides and crystals, potassium titanyl phosphate waveguides and crystals, lithium triborate waveguides and crystals, barium borate waveguides and crystals, optical fibers, silicon nanowires, and amorphous silicon nanowaveguides.

For the phase coherent conversion, the idler beam is aligned and combined with the reflected signal in the same or a similar nonlinear parametric device with similar nonlinear optical properties to create the signature photons.

Condition (iii) can be met by applying time and bandwidth limited filters to the signature photons before detection, such as a time shutter followed by a spectral filter. An example is shown in Y.-P. Huang, J. B. Altepeter, and P. Kumar, "Heralding single photons without spectral factorability," Phys. Rev. A 82, 043826 (2010), the disclosure of which is incorporated by reference herein in its entirety. It can also be realized by using quantum frequency conversion, an example of which is shown in Y.-P. Huang and P. Kumar "Mode-resolved Photon Counting via Cascaded Quantum Frequency Conversion," Optics Letters 38, 468 (2013), the disclosure of which is incorporated by reference herein in its entirety. Another example showing the realization by using quantum frequency conversion can be found in A. Shahverdi, Y. M. Sua, L. Tumeh, and Y.-P. Huang, "Quantum Parametric Mode Sorting: Beating the Time-Frequency Filtering," Scientific Report 7 6495 (2017), the disclosure of which is incorporated by reference herein in its entirety.

In one embodiment, all of conditions (i)-(iii) discussed above are satisfied simultaneously in order to improve the advantage in SNR.

FIG. 1 shows an exemplary implementation of the technique in the optical domain in accordance with an embodiment of the present invention. An optical pump pulse train in a single spatial mode is generated by a pulse generator 10 and is passed through a single-mode filter 12, which ensures that each pump pulse is in only a single time-frequency mode. The pump pluses are then used to create correlated beams (i.e., signal and idler beams) in an optical parametric downconverter 14. The signal beam is then sent to interact with a target, while the idler beam is retained in a delay line 16, which, in one embodiment, is made of a set of optical fiber loops capable of switching in and switching out optical pulses. By controlling the total time the idler beam is kept inside the delay line 16, the idler beam and the returning signal beam can be temporally aligned and combined in a parametric upconverter 18, in which two photons, each in a paired signal and idler mode, can be combined to create a new signal photon at sum frequency of the two photons. The signal photons are then passed through a single mode filter 20 and are detected a detector 22.

Figure 2:
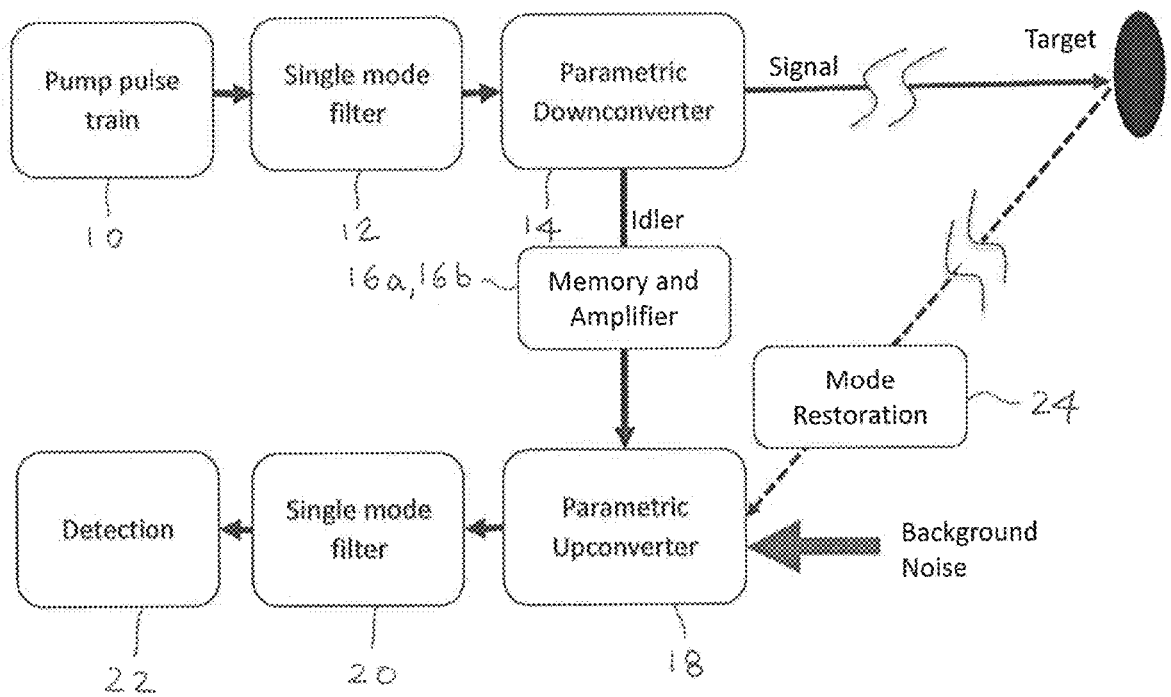
FIG. 2 is a schematic diagram of a quantum measurement process performed in accordance with another embodiment of the present invention, the process using a nonlinear optics setup with an idler beam amplified and returning signal modes corrected for mode distortion.

FIG. 2 shows another exemplary implementation involving procedures similar to those illustrated in FIG. 1, with the following differences. First, after its production, the idler beam is passed through an optical memory device 16a followed by an optical amplification device 16b. The optical memory device 16a is to delay the idler beam (i.e., idler pulses) so that they can be temporally aligned with the returning signal beam (i.e., signal pulses). The optical amplification device 16b is adapted to amplify the idler pulses so that their optical power is sufficient to effectively convert the returning signal pulses. For the conversion to be efficient, the output idler pulses need not to experience significant mode distortion, including any significant change in their temporal pulse shapes or spectral profiles, and any significant increase in the background noise. If there is significant mode distortion, the idler beam may undergo additional optical devices to adequately compensate for such distortion. Second, in some applications, especially those involving transmission of the signal beam over a long distance in atmosphere, the returning signal pulses may be in distorted modes, meaning that their mode profiles of spatial, temporal, or spectral modes may be significantly different from their modes as initially created in the parametric downconverter 14. In such a case, before being combined with the idler beam, the signal beam may pass through one or more mode-restoration devices 24 to adequately compensate for the mode distortion. For a spatial mode distortion, the mode-restoration device 24 can be a spatial light modulator (e.g., a device sold as model SLM-100 by Santec Corporation). For a mode distortion caused by a group velocity dispersion in the atmosphere, the mode-restoration device 24 may include a group-velocity dispersion compensation fiber.

The pump pulses can be directly created in a single mode by using a mode-locked laser whose output is typically transform-limited pulses. In certain embodiments, the pump pulses are further filtered using a spectral filtering device to reduce the background noise, to increase the pulse width, or to reshape the pulse profile. Another way to create such pump pulses in a single mode with desirable mode profiles is to use an optical arbitrary waveform generator (hereinafter "OAWG"), such as the one disclosed in U.S. Application Publication No. US 20080089698 A1, entitled "Optical arbitrary waveform generation and processing using spectral line-by-line pulse shaping", the disclosure of which is incorporated herein in its entirety. An exemplary implementation of the OAWG involves the following steps. First, a narrowband laser in continuous waves (such as those with spectral bandwidth less than 100 kHz) is modulated by an optical comb generator (e.g., an optical comb generator sold as model WTAS-02 by Optical Comb, Inc.) to create optical frequency comb lines around the central wavelength of the input laser. Second, the combs may be amplified and passed through a suitable optical processor, such as the device known as "WaveShaper" (Model: 16000S, Manufacturer: Finisar), where the amplitude and phase of each comb line is modulated individually and then multiplexed at a single output to create pump pulses in the desired phase and amplitude profiles. Third, the created phase and amplitude profiles may be measured using either or both an optical spectrum analyzer and/or a frequency-resolving optical gating device (e.g., FROG devices available from Coherent Solutions Inc.). The measurement results may then be compared with the desirable phase and amplitude profiles. If the results are not acceptable, the comb lines' amplitude and phase may be adjusted in the optical processor (e.g., the WaveShaper device) to improve the resulting pulse profiles as measured by either or both the optical spectrum analyzer and/or the frequency-resolving optical gating device. This procedure may be iterated until acceptable amplitude and phase profiles are measured and/or attained.

In one embodiment, the use of the OAWG discussed above is applicable only to pump pulses in the telecom C-band. To create optimized pump pulses in other wavelength bands, one can use frequency conversion in nonlinear media, such as sum-frequency generation, difference-frequency generation, four-wave mixing bragg scattering, and four-wave mixing wavelength conversion, to convert the created telecom pulses into a desirable spectral band.

In one embodiment, the single-mode pump pulses are used to create twin beams, signal and idler, in an optical parametric downconverter 14. For the downconverter 14, there is a wide range of commercial products to choose from. For example, it can be a lithium niobate crystal or waveguide (e.g., those manufactured by HC Photonics Corp. or ADvR Inc.), a potassium titanyl phosphate waveguide or crystal (e.g., those manufactured by Raicol Crystals Ltd.), a lithium triborate waveguide or crystal (e.g., those manufactured by Raicol Crystals Ltd.), a barium borate waveguide or crystal (e.g., those manufactured by Raicol Crystals Ltd.), an piece of optical fiber (e.g., those manufactured by Newport Corporation), a silicon nanowire on chip (such as the one used in Xiang Zhang, Bryn Bell, Mark Pelusi, Jiakun He, Wei Geng, Yunchuan Kong, Philipp Zhang, Chunle Xiong, and Benjamin J. Eggleton, "High repetition rate correlated photon pair generation in integrated silicon nanowires," Applied Optics Vol. 56, pp. 8420-8424 (2017)), or a hydrogenated amorphous silicon waveguide on chip (such as the one used in Ke-Yao Wang, Vesselin G. Velev, Kim Fook Lee, Abijith S. Kowligy, Prem Kumar, Mark A. Foster, Amy C. Foster, and Yu-Ping Huang, "Multichannel photon-pair generation using hydrogenated amorphous silicon waveguides," Opt. Lett. 39, 914 (2014)). For typical lithium niobate waveguides, the phase matching bandwidth is 20 nm or more for the downconversion into the telecom spectral bands. For example, using a 775-nm pump laser, signal and idler photons can be created in pairs in a spectral range between 1540 nm and 1560 nm. Thus, using pump pulses with 100 ps pulse width, signal and idler beams can be created, each containing about 100 modes. For some highly-nonlinear optical fibers and hydrogenated amorphous silicon waveguides, the phase matching bandwidth can be over 50 nm. The use of longer pump pulses and/or nonlinear parametric devices with broader phase-matching bandwidth allows more signal and idler modes to be used, thus achieving a high detection SNR against broadband background noise.

As illustrated in FIGS. 1 and 2, the signal beam is sent to interact with the target, while the idler beam is retained using an optical memory or a delay line 16, 16a. Depending on the need, the idler beam can be amplified in an optical amplifier 16b, such as an erbium-doped fiber amplifier. The reflected signal beam and the idler beam are temporally aligned and combined in a parametric upconverter 18. In typical applications, the reflected signal beam is much weaker than the idler beam and is accompanied with significant background noise.

With reference to FIGS. 1 and 2, the parametric downconverter 14, which generates the signal and idler beams, and the parametric upconverter 18, where the idler and returning signal beams are combined to create signature photons, can each be implemented in nonlinear optical devices having identical or similar nonlinear optical properties. Alternatively, the parametric downconverter 14 and the parametric upconverter 18 can also be implemented using a signal nonlinear optical device, where the two processes can be temporally multiplexed or simultaneously occur but along counter-propagation directions in the devices by using optical circulators.

Figure 3:
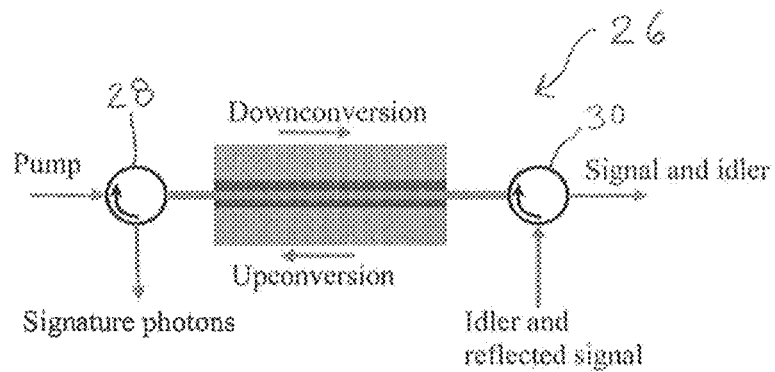
FIG. 3 is a diagram illustrating parametric downconversion and upconversion in a single waveguide.

FIG. 3 shows a design for the counter-propagation configuration realized in a nonlinear waveguide 26 in accordance with one embodiment. The pump pulses enter the waveguide 26 from the left through an optical circulator 28. The signal and idler beams are created via parametric downconversion as the pump propagates to the right, and exit to the right via another optical circulator 30. Meanwhile, the idler and reflected signal created from the previous pump pulses enter the same waveguide 26 from the right via the second optical circulator 30. As the idler and reflected signal travel to the left, the photons in the reflected signal beam are up-converted to the signature photons, which exit via the first circulator 28. This counter-propagation scheme ensures that the upconversion process is phase coherent for the signal and idler beams once they are temporally aligned. In other embodiments, the foregoing scheme is implemented using separate nonlinear optical devices with similar nonlinear optical properties, such as nearly identical phase matching curves.

Referring back to FIGS. 1 and 2, the converted photons pass through a single-mode filter 20 which selects the same or similar mode as the pump pulses driving the parametric downconverter 14. In one embodiment, the filter 20 includes a band-pass spectral filter and a time shutter. In other embodiments, the filter 20 may be implemented using a quantum frequency conversion process.

Using the process illustrated in FIG. 1, the detection efficiency of the reflected signal photons is much higher than that for background photons without prior quantum correlation with the idler beam. To illustrate this, one can consider the following idealized parametric downconversion process: $\hat{a} \to \Sigma_{j=1}^{M} = \hat{b}_j \hat{c}_j$, where a pump photon in a single mode $\hat{a}$ creates a pair of signal and idler photons simultaneously in M paired modes $\{\hat{b}_j, \hat{c}_j\}$ with equal probability. There are many photons in each pump pulse, so that there are on average many signal-idler photon pairs created at the same time, with nearly equal population distribution across many modes. In this case, while the individual photons in each mode of either signal or idler beams do not have fixed phase values relative to photons in other modes of the same beam, the paired photons in the two beams are in phase with other photon pairs in the same or different modes created by the same pump pulse. In other words, the total phase of the signal and idler photons in a pair is substantially uniform across many modes. This is because all photon pairs are created through a parametric nonlinear process driven by the same parent pump pulse. Because of this phase relation, when recombined in the same nonlinear device or a separate device but with nearly identical phase matching properties, they will undergo the following nonlinear process: $\Sigma_{j=1}^{M} \hat{b}_j \hat{c}_j \to \hat{a}$, to create signature photons, which is the time reversal of the twin-beam generation process. The number of the created signature photons is then given by $N_c \sim |\Sigma_{j=1}^{M} \hat{b}_j \hat{c}_j|^2$. This means if each mode has a mean-photon number n, the created signature photon number is proportional to $N_c \sim M^2 n$.

In contrast, for the background photons, the upconversion is not phase coherent, because they are not paired with the idler beam and have random phase. As a result, the number of the created signature photons is given by the phase incoherent summary over the modes. If each mode has a background photon occupation of n, which yields the same average photon numbers with the above reflected signal, the created signature photons under the same detection condition will amount to $N_f \sim Mn$. It is clear that $N_f = N_c/M$, i.e., under the condition of the same modes, the same photon occupation in each mode, and using the same detection system, the detection efficiency for the reflected signal photons is M times higher than that for background photons. This benefit comes from the fact that the conversion process is phase coherent for the returning signal beam, but not for the background photons.

In the examples illustrated in FIGS. 1 and 2, the signature photons are created through an upconversion process, where the one signal photon and one idler photon is combined to create a signature photon whose energy is the sum of the signal and idler photons. In alternate embodiments, other parametric conversion processes may be used to achieve the same functionality. For example, the signature photons can be created through a difference frequency generation or four-wave mixing process between the signal and idler photons. In all possible realizations, the returning signal photons in different modes need to phase coherently converted to signature photons in a single or a few modes.

Figure 4:
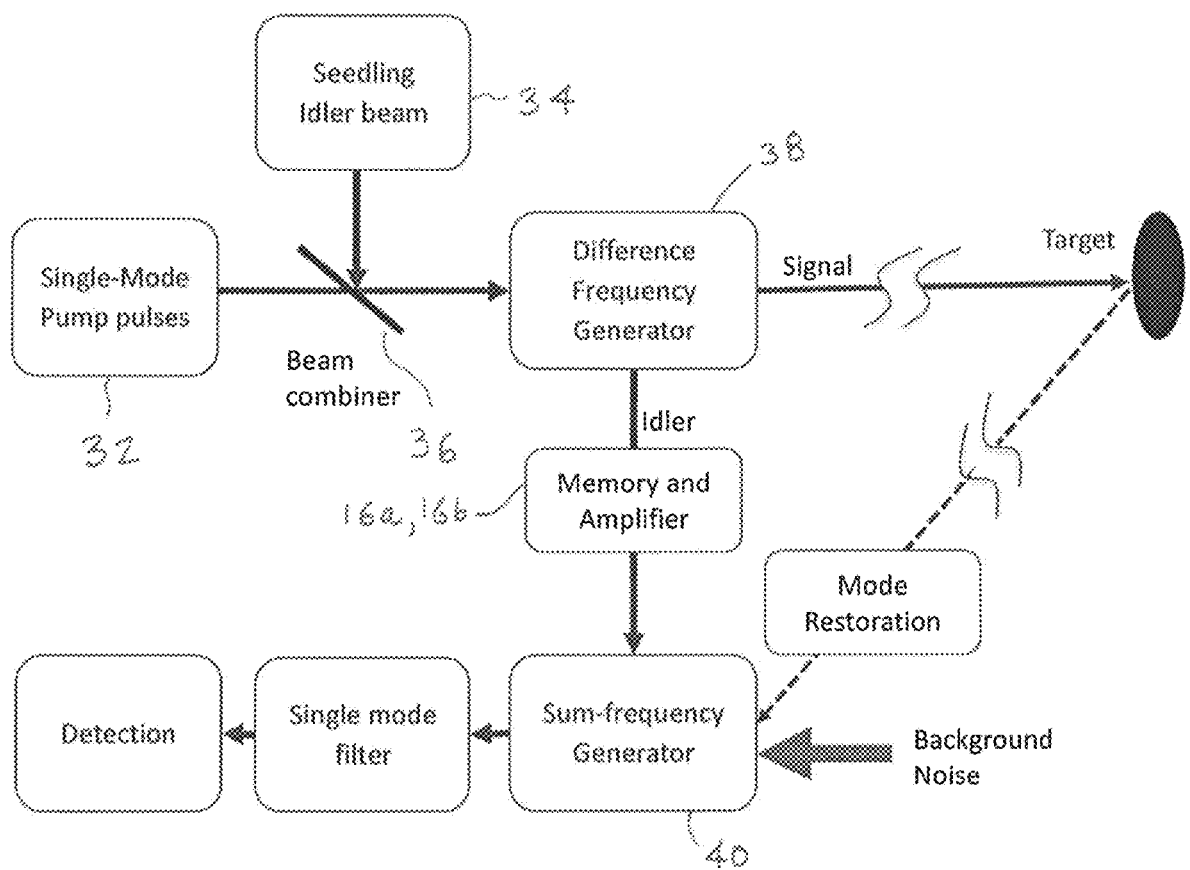
FIG. 4 is a schematic diagram of a quantum measurement process performed in accordance with another embodiment of the present invention, the process using nonlinear optic setup and a signal beam created by using pumping pulses and a seedling idler beam.

FIG. 4 shows another embodiment also based on nonlinear optics, but with a seedling idler beam. First, a pump pulse train 32 is created with each pulse corresponding to a single time-frequency and spatial mode. An idler beam 34 is created with many photons in a single spatial mode but roughly equally distributed among many time-frequency modes. An idler beam of this property can be generated via amplified spontaneous emission in an optical amplifier without any input laser. Depending on the application, the amplifier output sometimes needs to pass additional spectral filtering and/or temporally modulating devices to create the idler beam in desirable spectral and temporal modes. The idler beam 34 is aligned and combined with the pump pulse train at a beam combiner 36, which can be a dichroic mirror, a wavelength-division multiplexer, or a grating filter. The combined beam is then guided into a difference-frequency generator 38, where a signal beam is created through a difference-frequency generation (DFG) process. In one embodiment, the difference frequency generator 37 is a nonlinear parametric device such as a lithium niobate crystal or waveguide (e.g., those manufactured by HC Photonics Corp. or ADvR Inc.), a potassium titanyl phosphate waveguide or crystal (e.g., those manufactured by Raicol Crystals Ltd.), a barium borate waveguide or crystal (e.g., those manufactured by Raicol Crystals Ltd.), a piece of optical fiber (e.g., those manufactured by Newport Corporation), a silicon nanowire on chip (such as the one used in Xiang Zhang, Bryn Bell, Mark Pelusi, Jiakun He, Wei Geng, Yunchuan Kong, Philipp Zhang, Chunle Xiong, and Benjamin J. Eggleton, "High repetition rate correlated photon pair generation in integrated silicon nanowires," Applied Optics 56, 8420 (2017)), or a hydrogenated amorphous silicon waveguide on chip (such as the one used in Ke-Yao Wang, Vesselin G. Velev, Kim Fook Lee, Abijith S. Kowligy, Prem Kumar, Mark A. Foster, Amy C. Foster, and Yu-Ping Huang, "Multichannel photon-pair generation using hydrogenated amorphous silicon waveguides," Opt. Lett. 39, 914 (2014)). To produce a single beam with many modes, the seedling idler beam's spectral width needs to be comparable with or larger than the phase matching bandwidth of the DFG process driven by the pump. For typical lithium niobate waveguides, the phase matching bandwidth is 20 nm in the telecom spectral band. Thus, if using transform-limited pump pulses with 100 ps pulse width and sub-GHz bandwidth, and seedling idler pulses of the same pulse width but 10 nm spectral bandwidth, a signal beam will be created in about 100 modes while the idler beam is amplified. For typical hydrogenated amorphous silicon waveguides, the phase matching bandwidth can be over 50 nm. Using longer pump pulses or phase matching with larger bandwidth, the signal beam will be created in more modes.

Still referring to FIG. 4, the signal beam is sent to interact with a target, while the idler beam is retained using an optical memory 16a or an optical delay line 16. Depending on the need, the idler beam can be additionally amplified in an optical amplifier 16b, such as an erbium-doped fiber amplifier. The reflected signal beam is temporally aligned with and converted to a signature beam by the idler beam in a sum-frequency generation (SFG) device 40. As in the embodiment discussed above and shown in FIG. 1 and FIG. 2, the SFG can be the same nonlinear optical device or a separate nonlinear optical device but with similar nonlinear optical properties, such as nearly identical phase matching curves. The photons in the signature beam will be filtered and detected such that only the signature photons in the same mode as the pump for the DFG process are detected.

In the scheme illustrated in FIG. 4, the signal beam is first created via DFG and then detected via SFG. An equivalent scheme can be implemented with the signal created via SFG and detected via DFG. It has the same benefits coming from the phase coherent conversion.

In one embodiment, the signal emission and receiving components of the systems shown in FIGS. 1, 2 and 4 are mounted on a laser-scanning apparatus, so that the launching and receiving angles of the signal beam can be scanned. Meanwhile, the relative delay between the paired signal and idler pulses is also scanned. Based on the number of signature photons detected as the angles and delay are scanned, three-dimensional surface profiles of surrounding objects can be reconstructed. Compared to direct lidar or radar measurement, the systems based on the phase-coherent photon conversion can achieve a much higher signal to noise ratio, a better measurement resolution, and are robust to apply in a complex environment with strong background noise. Example applications include surveillance and surrounding data collection for autonomous automobiles, autonomous drones, and robotic machines, for which accurate 3D images of the surrounding environment must be obtained reliably despite unpredictable background disturbances, including foreign light illumination on the detector whose strength is much higher than the reflected signal.

In another embodiment, the technique of phase-coherent photon conversion is utilized for detection and imaging under the constraint of low peak power for the probe. This includes non-destructive imaging of light-sensitive biomedical samples and light-reactive chemical samples, where the high peak power of the probe beam damages or destroys the samples. By spreading the photons in the signal beam over a large amount of modes, the signal peak power can be made very low and suitable for probing light-sensitive or light-reactive materials.

Figure 5:
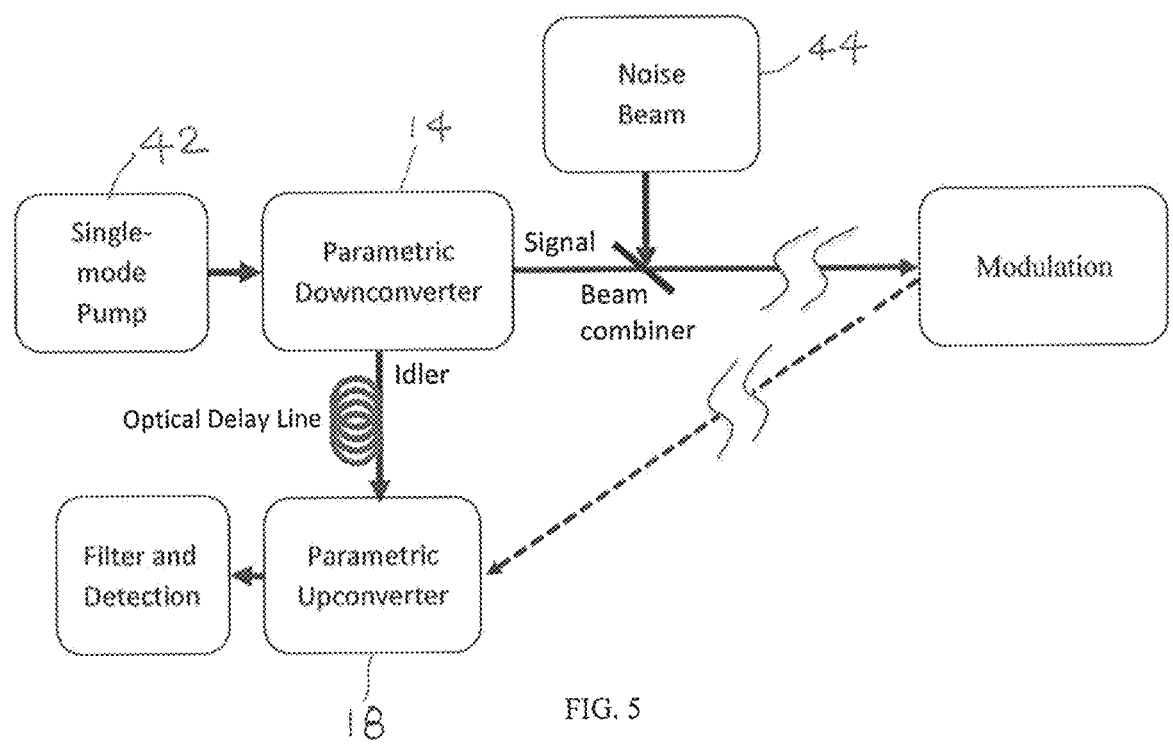
FIG. 5 is a schematic diagram of a covert communication process performed in accordance with an embodiment of the present invention, where the signal is buried in a strong broadband noise beam.

In another embodiment, the technique of phase-coherent photon conversion is utilized for covert communications. Referring to FIG. 5, a single-mode pump 42 creates low-power signal and idler twin beams in a parametric down-converter 14, with paired photons spreading over M pairs of signal and idler modes (where M is between 10 and 10,000 in one embodiment). The signal beam is mixed with a broadband noise beam 44, which spatially, temporally, and spectrally overlaps with the signal beam, but contains more photons that randomly distributed across many modes. The optical-power ratio between the noise and signal beam can be as high as 0.1*M. The mixed beams are then sent to a distant site, where they are received, manipulated to encode information, and sent back. The returning signal beam is then aligned and combined with the idler beam in a parametric upconverter 18 to phase coherently create signature photons, which are filtered and detected in a single mode. The returning noise beam is also converted by the idler beam, but the conversion efficiency is much lower, due to the absence of phase coherence. In the ideal case, the conversion efficiency for the signal beam is M times that of the noise beam, so that even when the noise beam is 0.1*M times more powerful than the signal beam, approximately 90% of the converted signature photons are from the signal beam. In this way, the signal beam can be effectively separated from the noise beam to extract the encoded information. By holding the idler beam confidentially, one can prevent a third-party from detecting the signal beam, as it is hidden well in the co-propagating noise beam that has much higher power. This is because without the idler beam, no third-party can preferably detect the manipulated signal beam against the noise beam. Because the noise beam is stronger than the signal beam in terms of the optical power, little to no useful information can be extracted by the third-party.

Figure 6:
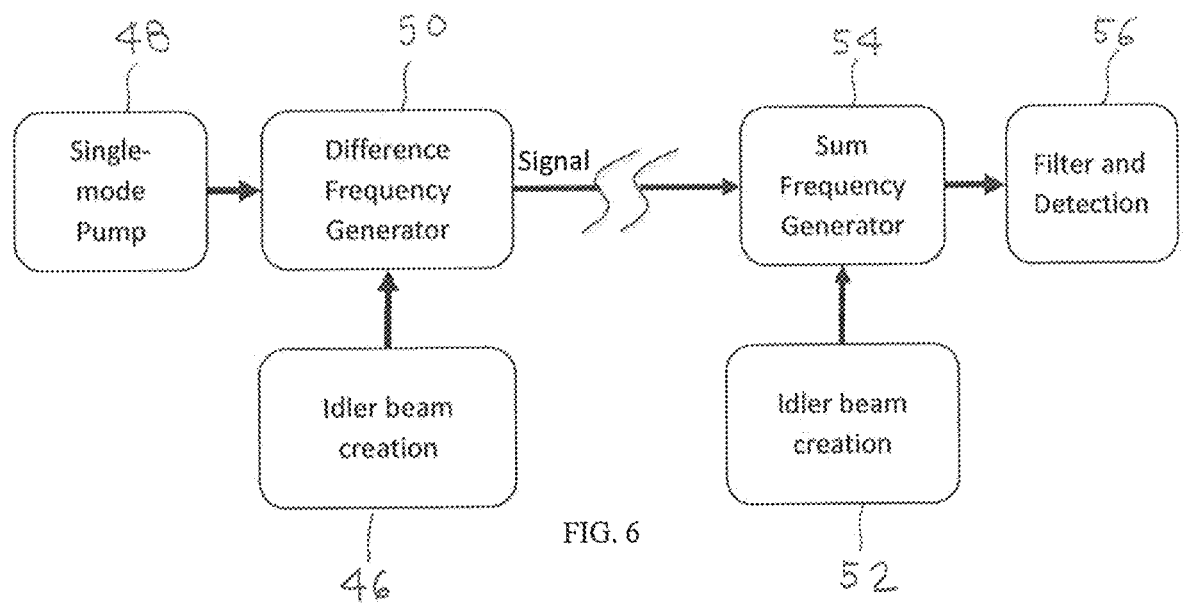
FIG. 6 is a schematic diagram of a covert communication process performed in accordance with an embodiment of the present invention, where the signal is hidden in the ambient light.

In another embodiment for covert communications, two parties, Party A and Party B, share secret and identical keys. Referring to FIG. 6, Party A uses a part of the keys to create an idler beam 46 in many modes based on phase encoding across the modes. By mixing the idler beam with a single-mode pump 48 in a difference frequency generator 50, a low-power signal beam is created whose intensity is below that of ambient light in surrounding atmosphere from, for example, blackbody radiation, sunlight, and lighting devices. The attenuated signal is modulated to encode information and then transmitted through the atmosphere to Party B. Meanwhile, Party B uses the secret keys to create a nearly identical copy of the idler beam 52, which is then combined with the received signal beam in a sum-frequency generator 54 to phase-coherently create signature photons for filtering and detection 56. During this process, the ambient light will also mix with the copied idler beam in the sum-frequency generator 54 to create signature photons, but with a much lower efficiency as there is no phase coherence. By choosing the proper amount of modes, the transmitted power level of the signal beam can be made much lower than the ambient light, so that its presence is covered and undetectable by any third-party, but the detected power level of the signal is much higher than the ambient light based on the phase coherent sum-frequency generation.

In another embodiment, the disclosed technique is used for deep tissue imaging, where three-dimensional images of deep tissues can be reconstructed through timing the reflected signals, even in the presence of strong loss and scattering. This is because the detection of the reflected signals is efficient only when they are aligned with the idler beam accurately in both space and time.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be understood that the embodiments described herein are merely exemplary and that a person skilled in the art may make many variations and modifications without departing from the spirit and scope of the invention. All such variations and modifications are intended to be included within the scope of the invention.

I claim:

1. A method for discriminatively detecting electromagnetic waves, comprising the steps of:
   generating a signal beam and an idler beam in a plurality of paired modes, said signal beam being generated using a parametric downconversion process;
   transmitting the signal beam;
   receiving at least a portion of the transmitted signal beam;
   temporally aligning and combining the idler beam, or a copy thereof, with the at least a portion of the transmitted signal beam to form combined signal and idler beams;
   generating signature photons from the combined signal and idler beams, said generating step including the performance of a phase coherent nonlinear process by subjecting the combined signal and idler beams to a parametric upconversion process, which corresponds to the time reversal of the parametric downconversion process; and
   filtering and detecting the signature photons in at least one of the plurality of paired modes.

2. The method of claim 1, further comprising the step of storing the idler beam in an optical delay line or in a memory device.

3. The method of claim 1, wherein the at least a portion of the transmitted signal beam is reflected from a target object.

4. The method of claim 3, further comprising the step of scanning the angle at which the signal beam is transmitted and the time delay of the idler beam from the signal beam to remotely obtain three-dimensional information regarding the object.

5. The method of claim 1, wherein said step of generating a signal beam and an idler beam is performed using a single-mode pump.

6. The method of claim 5, wherein said filtering and detecting step includes the step of filtering the signature photons in order to keep only those in a mode that is substantially identical with that of the single-mode pump.

7. The method of claim 1, further comprising the step of optionally compensating for mode distortion of the signal beam.

8. The method of claim 1, further comprising the step of optionally amplifying the idler beam prior to the performance of said aligning and combining step.

9. Apparatus for discriminatively detecting electromagnetic waves, comprising:
   a generator for generating a signal beam and an idler beam in a plurality of paired modes, said generator including a parametric downconverter to generate the signal beam;
   a transmitter for transmitting the signal beam;
   a receiver for receiving at least a portion of the transmitted signal beam;
   an aligning device for temporally aligning and combining the idler beam, or a copy thereof, with the at least a portion of the transmitted signal beam so as to generate signature photons from the combined signal and idler beams, said aligning device including a parametric upconverter, which corresponds to the time reversal of said parametric downconverter, to generate the signature photons; and a detector, including a filter, for detecting the signature photons in at least one of the plurality of paired modes.

10. The apparatus of claim 9, further comprising a storage device for storing the idler beam.

11. The apparatus of claim 10, wherein said storage device includes an optical delay line or a memory device.

12. The apparatus of claim 9, further comprising at least one scanner for scanning the angle at which the signal beam is transmitted and the time delay of the idler beam from the signal beam to remotely obtain three-dimensional information relating to an object from which the signal beam is reflected and received by said receiver.

13. The apparatus of claim 9, wherein said generator includes a single-mode pump to generate the signal beam.

14. A method for discriminatively detecting electromagnetic waves, comprising the steps of:

generating a signal beam and an idler beam in a plurality of paired modes, through the performance of a difference-frequency generation process using a seedling beam;

transmitting the signal beam;

receiving at least a portion of the transmitted signal beam;

temporally aligning and combining the idler beam, or a copy thereof, with the at least a portion of the transmitted signal beam to form combined signal and idler beams;

generating signature photons from the combined signal and idler beams by subjecting the combined signal and idler beams to a sum-frequency generation process, which is the time reversal of the difference-frequency generation process; and filtering and detecting the signature photons in at least one of the plurality of paired modes.

15. The method of claim 14, wherein the signal beam is generated using a single-mode pump and the seedling idler beam through the difference-frequency generation process.

16. Apparatus for discriminatively detecting electromagnetic waves, comprising:

a generator for generating a signal beam and an idler beam in a plurality of paired modes, said generator including a difference-frequency generator to generate the signal beam;

a transmitter for transmitting the signal beam;

a receiver for receiving at least a portion of the transmitted signal beam;

an aligning device for temporally aligning and combining the idler beam, or a copy thereof, with the at least a portion of the transmitted signal beam so as to generate signature photons from the combined signal and idler beams, said aligning device including a sum-frequency generator, which is the time reversal of the difference-frequency generator, to generate the signature photons; and a detector, including a filter, for detecting the signature photons in at least one of the plurality of paired modes.

* * * * *